(12) United States Patent
Baby et al.

(10) Patent No.: US 7,814,117 B2
(45) Date of Patent: Oct. 12, 2010

(54) ACCESSING DATA FROM ASYNCHRONOUSLY MAINTAINED INDEX

(75) Inventors: Thomas Baby, Foster City, CA (US); Sivasankaran Chandrasekar, Palo Alto, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 334 days.

(21) Appl. No.: 11/784,341

(22) Filed: Apr. 5, 2007

(65) Prior Publication Data

US 2008/0249990 A1    Oct. 9, 2008

(51) Int. Cl.
  *G06F 7/00* (2006.01)
  *G06F 17/30* (2006.01)

(52) U.S. Cl. ..................................... 707/769
(58) Field of Classification Search ............... 707/1–10, 707/100–104.1, 200–206; 711/156
  See application file for complete search history.

(56) References Cited

U.S. PATENT DOCUMENTS

| | | | |
|---|---|---|---|
| 5,280,612 A | 1/1994 | Lorie et al. | |
| 5,317,731 A | 5/1994 | Dias et al. | |
| 5,347,653 A | 9/1994 | Flynn et al. | |
| 5,440,730 A | 8/1995 | Elmasri et al. | |
| 5,452,445 A * | 9/1995 | Hallmark et al. | 707/2 |
| 5,553,279 A | 9/1996 | Goldring | |
| 5,613,113 A | 3/1997 | Goldring | |
| 5,638,508 A | 6/1997 | Kanai et al. | |
| 5,643,633 A | 7/1997 | Telford et al. | |
| 5,701,480 A | 12/1997 | Raz | |
| 5,745,904 A | 4/1998 | King | |
| 5,758,149 A | 5/1998 | Bierma et al. | |
| 5,857,204 A | 1/1999 | Lordi et al. | |
| 5,870,590 A | 2/1999 | Kita et al. | |
| 5,870,758 A | 2/1999 | Bamford et al. | |

(Continued)

FOREIGN PATENT DOCUMENTS

FR    2 746 526 A1    9/1997

OTHER PUBLICATIONS

Tirthankar Lahiri et al., 50,000 users on an Oracle8 universal server database, 1998, ACM, 528-530.*

(Continued)

*Primary Examiner*—Jean B Fleurantin
(74) *Attorney, Agent, or Firm*—Hickman Palermo Truong & Becker LLP; Eric L. Sutton

(57) ABSTRACT

A method and apparatus for computing queries in a way that is consistent with an index and the underlying base table is provided. A query is computed such that it is consistent with the state of an index and base table as of the last point at which the index and table were synchronized. For example, if an index is maintained asynchronously then it is not necessarily consistent with its base table when a query is to be run against the table and the index. Therefore, the query is computed such that it will be consistent with the last point at which the index and the table were synchronized. In one embodiment, a System Change Number (SCN) of the last successful synchronization operation is used to perform a flashback query on the table.

22 Claims, 2 Drawing Sheets

U.S. PATENT DOCUMENTS

| | | | |
|---|---|---|---|
| 5,873,098 | A | 2/1999 | Bamford et al. |
| 5,873,102 | A | 2/1999 | Bridge, Jr. et al. |
| 5,878,410 | A | 3/1999 | Zbikowski et al. |
| 5,890,167 | A | 3/1999 | Bridge, Jr. et al. |
| 5,907,848 | A | 5/1999 | Zaiken et al. |
| 5,930,794 | A | 7/1999 | Linenbach et al. |
| 5,956,731 | A | 9/1999 | Bamford et al. |
| 5,974,427 | A | 10/1999 | Reiter |
| 5,996,088 | A | 11/1999 | Frank et al. |
| 6,012,059 | A | 1/2000 | Neimat et al. |
| 6,012,060 | A | 1/2000 | Loaiza et al. |
| 6,014,674 | A | 1/2000 | McCargar |
| 6,018,746 | A | 1/2000 | Hill et al. |
| 6,029,160 | A | 2/2000 | Cabrera et al. |
| 6,067,550 | A | 5/2000 | Lomet |
| 6,138,121 | A | 10/2000 | Costa et al. |
| 6,173,292 | B1 | 1/2001 | Barber et al. |
| 6,182,241 | B1 | 1/2001 | Ngai et al. |
| 6,192,377 | B1 | 2/2001 | Ganesh et al. |
| 6,192,378 | B1 | 2/2001 | Abrams et al. |
| 6,237,001 | B1 | 5/2001 | Bamford et al. |
| 6,243,702 | B1 | 6/2001 | Bamford et al. |
| 6,263,338 | B1 | 7/2001 | Ronström et al. |
| 6,321,234 | B1 | 11/2001 | Debrunner et al. |
| 6,330,573 | B1 | 12/2001 | Salisbury et al. |
| 6,360,228 | B1 | 3/2002 | Sundara et al. |
| 6,427,123 | B1 | 7/2002 | Sedlar |
| 6,449,624 | B1 | 9/2002 | Hammack et al. |
| 6,480,847 | B1 | 11/2002 | Linenbach et al. |
| 6,502,133 | B1 | 12/2002 | Baulier et al. |
| 6,505,228 | B1 | 1/2003 | Schoening et al. |
| 6,519,597 | B1 | 2/2003 | Cheng et al. |
| 6,567,928 | B1 | 5/2003 | Lyle et al. |
| 6,584,459 | B1 | 6/2003 | Chang et al. |
| 6,609,123 | B1 | 8/2003 | Cazemier et al. |
| 6,618,822 | B1 | 9/2003 | Loaiza et al. |
| 6,631,374 | B1 | 10/2003 | Klein et al. |
| 6,636,851 | B1 | 10/2003 | Bamford et al. |
| 6,647,473 | B1 | 11/2003 | Golds et al. |
| 6,647,510 | B1 | 11/2003 | Ganesh et al. |
| 6,681,230 | B1 | 1/2004 | Blott et al. |
| 6,697,805 | B1 | 2/2004 | Choquier et al. |
| 6,714,943 | B1 * | 3/2004 | Ganesh et al. ............ 707/104.1 |
| 6,728,719 | B1 * | 4/2004 | Ganesh et al. .............. 707/100 |
| 6,735,605 | B2 | 5/2004 | Bird et al. |
| 6,738,975 | B1 | 5/2004 | Yee et al. |
| 6,769,074 | B2 | 7/2004 | Vaitzblit |
| 6,769,124 | B1 | 7/2004 | Schoening et al. |
| 6,983,286 | B1 | 1/2006 | Sinha et al. |
| 7,031,956 | B1 | 4/2006 | Lee et al. |
| 7,139,746 | B2 | 11/2006 | Shin et al. |
| 7,162,485 | B2 | 1/2007 | Gottlob et al. |
| 7,171,404 | B2 | 1/2007 | Lindblad et al. |
| 7,171,407 | B2 | 1/2007 | Barton et al. |
| 7,216,127 | B2 | 5/2007 | Auerbach |
| 7,398,422 | B2 | 7/2008 | Amano et al. |
| 2001/0049675 | A1 | 12/2001 | Mandler et al. |
| 2002/0116457 | A1 | 8/2002 | Eshleman et al. |
| 2002/0152267 | A1 | 10/2002 | Lennon |
| 2002/0188613 | A1 | 12/2002 | Chakraborty et al. |
| 2003/0131051 | A1 | 7/2003 | Lection et al. |
| 2003/0177341 | A1 | 9/2003 | Devillers |
| 2003/0212664 | A1 | 11/2003 | Breining et al. |
| 2004/0010752 | A1 | 1/2004 | Chan et al. |
| 2004/0044659 | A1 | 3/2004 | Judd et al. |
| 2004/0148278 | A1 | 7/2004 | Milo et al. |
| 2004/0167864 | A1 | 8/2004 | Wang et al. |
| 2004/0205551 | A1 | 10/2004 | Santos |
| 2004/0225865 | A1 | 11/2004 | Cox et al. |
| 2004/0267760 | A1 | 12/2004 | Brundage et al. |
| 2005/0038688 | A1 | 2/2005 | Collins et al. |
| 2005/0050016 | A1 | 3/2005 | Stanoi et al. |
| 2005/0055385 | A1 | 3/2005 | Sinha et al. |
| 2005/0055603 | A1 | 3/2005 | Soran et al. |
| 2005/0091188 | A1 | 4/2005 | Pal et al. |
| 2005/0120031 | A1 | 6/2005 | Ishii |
| 2005/0228792 | A1 | 10/2005 | Chandrasekaran et al. |
| 2005/0229158 | A1 | 10/2005 | Thusoo et al. |
| 2005/0257201 | A1 | 11/2005 | Rose et al. |
| 2005/0289125 | A1 | 12/2005 | Liu et al. |
| 2006/0080345 | A1 | 4/2006 | Murthy et al. |
| 2007/0198615 | A1 | 8/2007 | Krishnamurthy et al. |

OTHER PUBLICATIONS

Benoît Dageville et al., SQL memory management in Oracle9i, Aug. 2002, ACM, 962-973.*

Shankar Pal et al., "Indexing XML Data Stored in a Relational Database", Proceedings of the 30$^{th}$ VLDB Conference, 2004, 12 pages.

Mackenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2$^{nd}$ Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

Claims, European patent application 05732473.3-1225, 3 pages.

Paul Ammann et al., "A Two Snapshot Algorithm for Concurrency Control In Multi-Level Secure Databases", IEEE online, pp. 204-215, Jan. 1992.

Nassima Djafri et al., Spatio-temporal evolution: querying patterns of change in databases, 2002, ACM Press, pp. 35-41.

Sirish Chandrasekaran et al., "PSoup: a system for streaming queries over streaming data", 2003, vol. 12, Issue 2, pp. 140-156.

Sandra Cheevers, Oracle Corporation, "Oracle9i Database Summary," An Oracle White Paper, May 2002, pp. 1-35.

Ron Weiss, Oracle Corporation, "Oracle 9i Availability and Manageability Technology," Feb. 13, 2001, pp. 1-39.

Ron Weiss, Oracle Corporation, "Oracle High Availability Architectural Overview," Feb. 12, 2001, pp. 1-37.

Oracle Corporation, "Oracle9i Flashback Query," Oracle 9i Database, Daily Feature, Apr. 18, 2002, pp. 1-2.

Oracle Corporation, "Flashback Technology," 2004, pp. 1-5.

Chiang Lee et al, "Temporal Grid File: A File Structure for Interval Data," Data & Knowledge Engineering, vol. 26, No. 1, May 1998, XP-001004414, pp. 71-97.

Toshiyuki Amagasa et al, "Implementing Time-Interval Class for Managing Temporal Data," International Workshop on Database and Expert Systems Applications, Aug. 26, 2003, XP-002167975, 7 pages.

* cited by examiner

ACCESSING DATA FROM ASYNCHRONOUSLY MAINTAINED INDEX

RELATED APPLICATIONS

This application is related to the following U.S. Patent Applications:

U.S. patent application Ser. No. 10/884,311, entitled INDEX FOR ACCESSING XML DATA (hereinafter "the XML Index application"), filed on Jul. 2, 2004, which is incorporated by reference herein.

U.S. patent application Ser. No. 11/286,873, entitled A MECHANISM FOR EFFICIENT MAINTENANCE OF XML INDEX STRUCTURES IN A DATABASE SYSTEM, filed on Nov. 22, 2005, which is incorporated by reference herein.

U.S. patent application Ser. No. 11/544,790, entitled FLASHBACK SUPPORT FOR DOMAIN INDEX QUERIES filed on Oct. 5, 2006, which is incorporated by reference herein.

FIELD OF THE INVENTION

The present invention relates to database systems. In particular, embodiments of the present invention relate to accessing data in an index that is asynchronously updated.

BACKGROUND

For more efficient data retrieval, most databases maintain indexes that summarize the contents of underlying base tables. One technique is to maintain the index synchronously with the column on which the index is built. In this technique, changes to a base table column made by data manipulation operations, such as insert, update, etc., (sometimes referred to as DMLs) are propagated to the index at the time when the column is updated. However, depending on the data, the time it takes to update the index can be significant.

Therefore, another technique is to maintain the index asynchronously. That is, changes to a column are not propagated to its corresponding index at the time of a DML. Instead, they are batched and propagated to the index at a later time. For example, the index can be "synced" with the indexed column either at the time of commit of the transaction that performed the DMLs, or it can be performed by a background scheduler job at a periodic interval, etc.

Thus, the asynchronously maintained index and its base table are not necessarily in a consistent state at all points. Consequently, if a query is to be executed against the index, the results of executing the query against the index may not reflect the state of the base table.

Therefore, improved techniques are desired for handling queries to indexes that are asynchronously updated.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Mechanisms are described for computing queries in a way such that the index is consistent with an indexed table. In one embodiment, a query is computed such that it is consistent with a previous logical point in time at which both state of an index and its base table were consistent.

A logical point of time, or logical time, is associated with each consistent state of a database of a database system. As transactions are committed by a database system, the database system transitions from one transactional consistent state to another transactional consistent state. A transactional consistent state is one in which a database of a database system is able to reflect all changes made by committed transactions and none of the changes made by the uncommitted transactions.

An example of a logical time is a system change number (SCN), sometimes referred to as a system change notice or sequence commit number. Each commit of a transaction is associated with an SCN. A counter for the SCN is incremented whenever a transaction is committed and/or the commit record for the transaction is generated. The transaction and its commit record are associated with the new counter value or SCN. Transactions recorded with redo records are associated with their corresponding SCNs therein.

When an index is maintained asynchronously, it transitions between consistency states, each of which is consistent with the database at previous logical time. To compute a query such that it is consistent with a logical time to which both index and table indexed are consistent, the query is rewritten using a flashback mechanism to compute the query consistently with the logical time. Such a logical point is referred to herein as a synchronization point of an index or simple synchronization point.

An embodiment of the present invention is illustrated within the context of rewriting queries that request XML data stored in database to underlying base tables that store the XML data or the underlying base tables that store data of an index. However, techniques discussed here may be used in any context in which database queries are rewritten to access the base data structures of an index.

Process Overview in Accordance with an Embodiment

Figure 1:
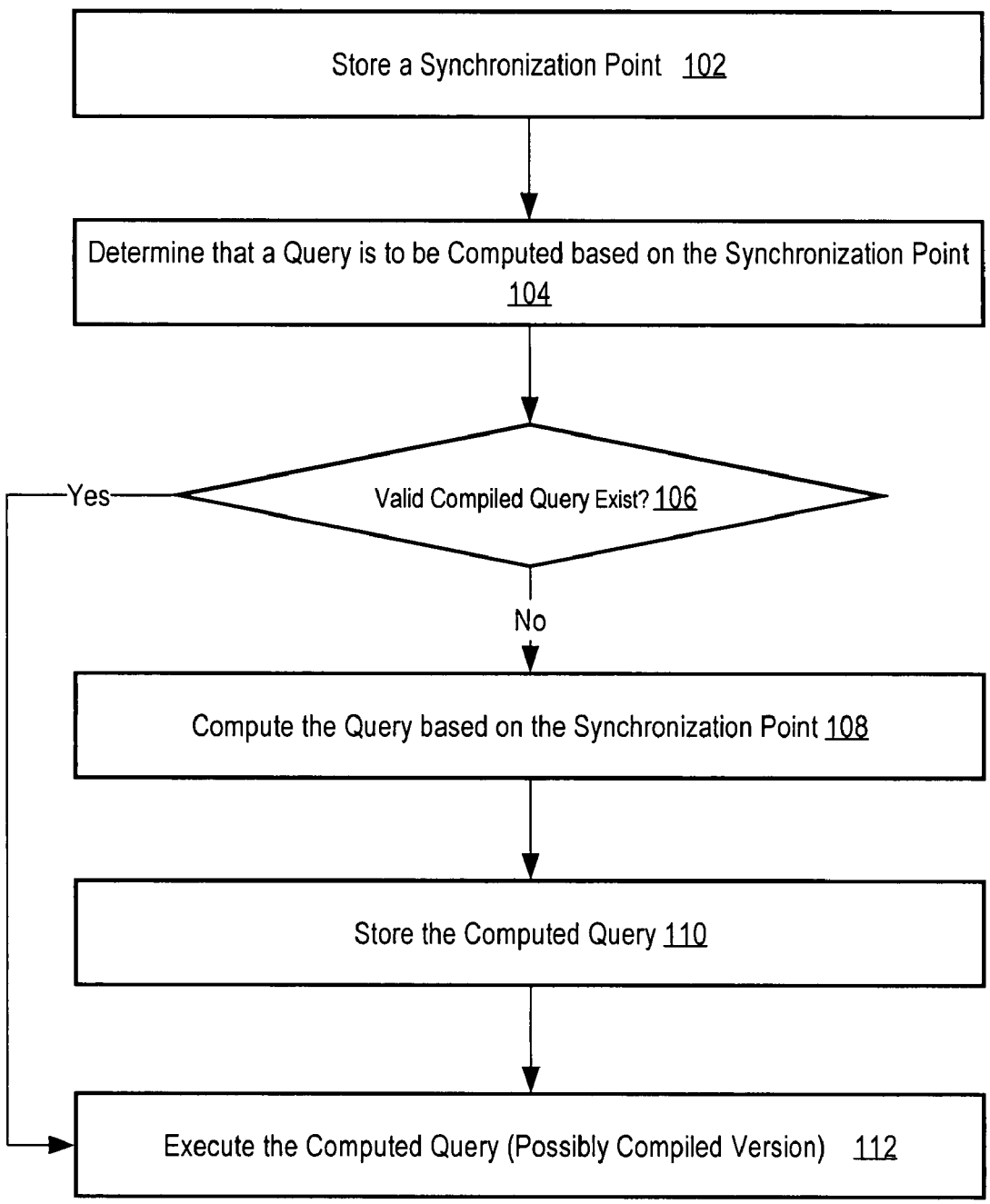
FIG. 1 is a flowchart illustrating a procedure for computing a query based on a synchronization point, in accordance with an embodiment of the present invention.

FIG. 1 is a flowchart illustrating a procedure 100 for computing a query in accordance with an embodiment. In step 102, a synchronization point with which the index and its table are in a consistent state is stored. For example, in response to synchronizing an index and a base table, a synchronization point is stored that marks the point at which the index and base table were synchronized. As a particular example, a System Change Number (SCN) is stored in a dictionary table. Each time that the index and base table are re-synchronized, the synchronization point is updated. Thus, the logical point at which the state of the base table and state of the index are consistent with each other is tracked.

In step 104, a determination is made to compute a query based on the synchronization point. In one embodiment, computing the query involves re-writing a query. An example is provided below in which an XML query is re-written. However, procedure 100 is not limited to that example. Briefly, that example involves re-writing a query of an XML table to optimize the query. More particularly, the query can be rewritten to be a join of the XML table and an XML index.

In step 106, a determination is made as to whether a valid compiled version of the query to be computed exists. Previously computed queries are stored to save the time of re-computing them. Whenever, the index and based table are synchronized, the complied queries are invalidated.

If a valid compiled version of the computed query does not exist, then the query is computed based on the synchronization point, in step 108. An example is provided below of computing a flashback query based on the synchronization point.

In step 110, the computed query is stored.

In step 112, the computed query is run to provide results based on data in the index and the base table as of the synchronization point.

Example XML Index

In an embodiment, the query to be computed is based on an XML query to be run against an XML data represented by and stored in relational and/or object-relational data structures of database system. More particularly, the XML query is re-written to access an index on at least one column of the XML base table. Thus, for illustrative purposes, an XML index will be used as an example of an asynchronously maintained index. However, the index can be any asynchronously maintained index. For example, the index might be a spatial index or an image index.

The XML Index application describes various embodiments of an index that may be used to efficiently access XML documents managed by a relational database server, based on XPath queries. Such an index shall be referred to herein as an XML index.

An XML index as described in the XML Index application may be used to process XPath queries regardless of the format and data structures used to store the actual XML data (the "base structures"). For example, the actual XML data can reside in structures within or outside of a database, in any form, such as CLOB (character LOB storing the actual XML text), O-R (object relational structured form in the presence of an XML schema), or BLOB (binary LOB storing some binary form of the XML data).

In one embodiment, an XML index is a logical index that results from the cooperative use of a path index, a value index, and an order index. The path index provides a mechanism to lookup nodes based on simple (navigational) path expressions. The value index provides the lookup based on value equality or range. The order index associates hierarchical ordering information with indexed nodes. The order index is used to determine parent-child, ancestor-descendant and sibling relationships between XML nodes.

According to one embodiment, the logical XML index comprises a PATH table, which is a relational table that stores one row for each XML node in an XML document. For each indexed node, the PATH table row for the node contains various pieces of information associated with the node.

When the user submits a query involving XPaths (as predicate or fragment identifier), the XPath statement is decomposed into an SQL query that accesses the XML index table(s). The generated query typically performs a set of path, value and order-constrained lookups and merges their results appropriately.

In one embodiment, a "SYNC operation" is used to update the XML index to bring it into a consistent state with its base table. The SYNC operation may be triggered by a commit operation or a periodically scheduled background job. Thus, the PATH TABLE and the base table are consistent with each other as of the last successful SYNC operation.

The Pending Table

In addition to the PATH TABLE, an asynchronous XML Index also includes a PENDING TABLE in which updates (e.g., DMLs) are logged until a SYNC operation, in one embodiment. In one embodiment, the PENDING table comprises at least two columns: opcode number and document-ID. The opcode number indicates the operation being performed. For instance, "1" in the opcode column indicates an insertion, "2" indicates a deletion, and "3" indicates an update. The document-ID field is the identifier of the document affected by a particular operation. During a SYNC operation, the rows in the PENDING TABLE are used to update the PATH TABLE.

If the XML Index is locally partitioned with its table, then one System Change Number (SCN) is stored as the synchronization point for each partition to achieve maximum partition level isolation, in an embodiment. The PENDING TABLE and the PATH TABLE are partitioned if the XML Index is partitioned, in an embodiment.

The Dictionary Table

A dictionary table of the XML Index, which contains metadata, stores a synchronization point in the form of the SCN of the last successful SYNC operation, in one embodiment. This SCN may be updated irrespective of what triggers the SYNC operation. For example, the trigger could be a commit operation a periodically scheduled background process.

When a SYNC operation completes, any query that may have been previously rewritten to use the SCN stored in the dictionary table for the XML Index is invalidated, in an embodiment. Therefore, the next time the query is to be run, the query is recompiled, potentially using a more recent SCN value.

Example Re-Write of XML Query

As previously discussed, a query is re-written to be run against the base tables of an index that is asynchronously maintained, in one embodiment. Furthermore, a synchronization point is used to re-write the query such that the query, when executed, will provide results for a logical point at which the data in the index and the base table were consistent with each other.

The following example of re-writing an XML query is used for illustration. As previously mentioned, an XML Index may comprise a storage table called the PATH TABLE. In the following example, an XML table called "SALES" has a PATH TABLE called "SALES_PATH_TABLE," which is built on a PURCHASEORDER column of the SALES table. Queries with XML operators such as extract, extractvalue, etc, may be optimized by rewriting the XML query to join of SALES and the PATH TABLE:

```
SELECT extractvalue(s.PURCHASEORDER,
    '/PurchaseOrder/LineItems/LineItem/@Id')
FROM SALES s
WHERE s.ID = 1001;
```

Because an XML index is present on the PURCHASEORDER column of the SALES table, the above query is rewritten to include a sub-query that joins the SALES table with the PATH TABLE (SALES_PATH_TABLE) of the corresponding XML Index. Such a rewritten query is shown below:

```
SELECT (SELECT VALUE
    FROM SALES_PATH_TABLE spt
    WHERE spt.RID = s.ROWID AND
        PATHID(spt.PATHID) = HEXTTORAW('0046') AND
        ISATTR(spt.LOCATOR) = 1
    )
FROM SALES s
WHERE s.ID = 1001.
```

Note, however, that if the XML index is maintained asynchronously, then the state of SALES_PATH_TABLE will not necessarily be consistent with the state of the PURCHASEORDER column of the SALES table when the query is executed. Therefore, prior to executing the query, the query is further rewritten to invoke a mechanism that computes the query consistently with the consistency state of the synchronization point. In one embodiment, the query is rewritten to a "flashback query".

As previously mentioned, a "SYNC operation" is used to update an index to bring it into a consistent state with its base table. The SCN of this of this state is stored as the synchronization point of the index.

Example Re-Write of XML Query Using Snapshot Clause in Accordance with an Embodiment Flashback queries specify computation of data consistent with a previous logical time. The database system responds to flashback queries by retrieving data and modifying the data using log records so that the data reflects the state of the database as of the specified logical time.

The query below is modified during query compilation to have an "AS OF SCN" clause having a flashback parameter of "67889879", as shown in below. The flashback parameter is accessed from the dictionary table, in one embodiment.

```
SELECT (SELECT VALUE
    FROM SALES_PATH_TABLE spt
    WHERE spt.RID = s.ROWID AND
        PATHID(spt.PATHID) = HEXTTORAW('0046') AND
        ISATTR(spt.LOCATOR) = 1
    )
FROM SALES s AS OF SCN 67889879
WHERE s.ID = 1001;
```

The above re-written query, when executed, computes a query so that computation results are consistent with the state of the SALES table as of the SCN 67889879, at which point the SALES table was consistent with the SALES_PATH_TABLE (the index for the SALES table).

It is not required that the clause that brings the SALES table back to the logical point at which the SALES table and its index are consistent be an "AS OF SCN" clause. An alternative is to use an "AS OF TIMESTAMP" clause. The following is an example with "ts" being a flashpoint parameter.

```
SELECT (SELECT VALUE
    FROM SALES_PATH_TABLE spt
    WHERE spt.RID = s.ROWID AND
        PATHID(spt.PATHID) = HEXTTORAW('0046') AND
        ISATTR(spt.LOCATOR) = 1
    )
FROM SALES s AS OF TIMESTAMP ts
WHERE s.ID = 1001.
```

Manual Sync Operation

A user has the option of invoking a SYNC operation manually on an XML Index, in an embodiment. This control allows users to preserve any application level constraints that may affect query semantics. For example, if a query operates on two XML tables, both of which have asynchronously maintained XML Indexes, then the application designer may choose to SYNC them at the same time, so that application level constraints are preserved by the re-written query.

Hardware Overview

Figure 2:
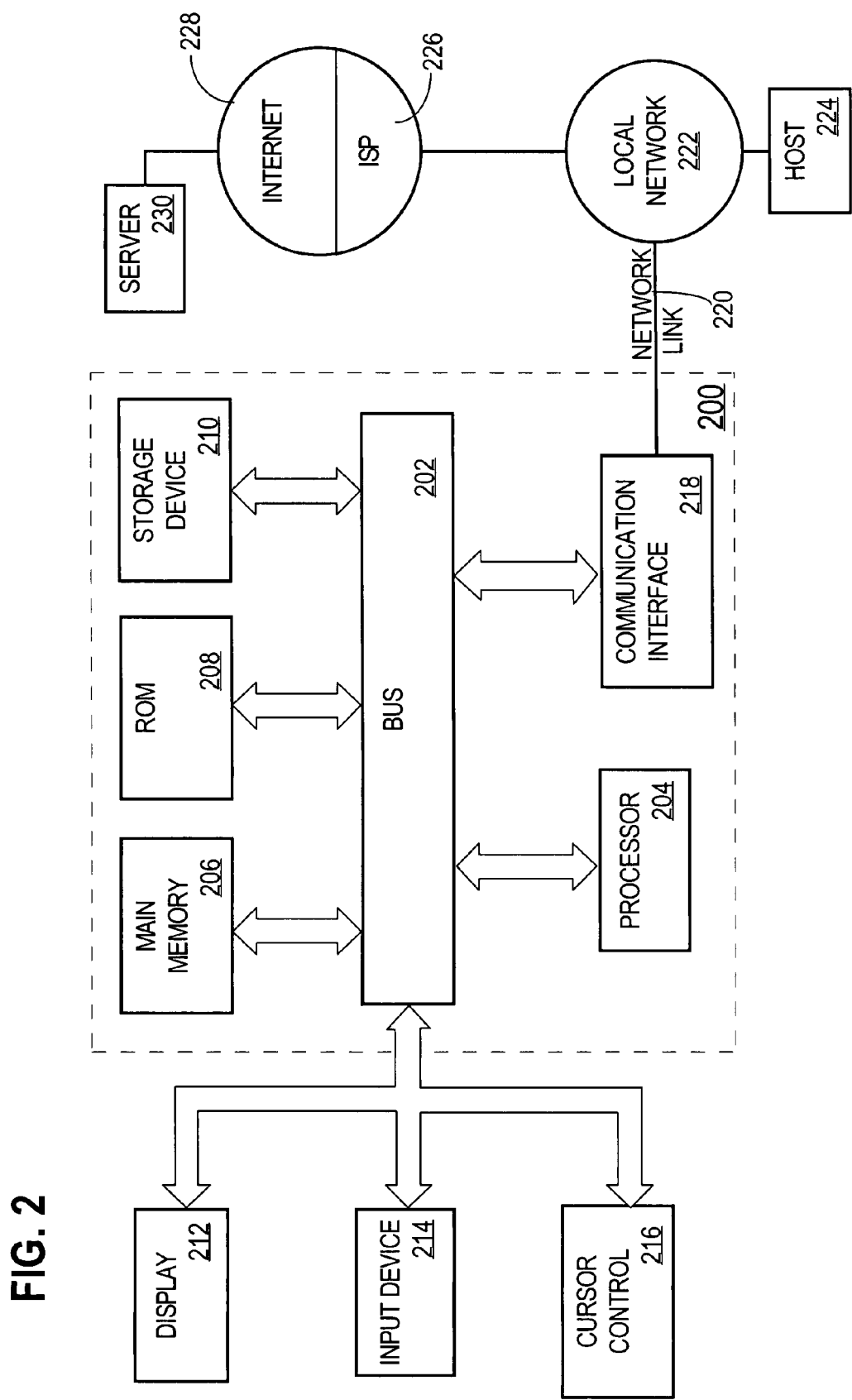
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be,used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   determining a plurality of values, wherein each value of the plurality of values represents a logical point in time at which a database reflects changes made by committed transactions;
   maintaining, on a volatile or non-volatile computer-readable storage medium, a particular value of the plurality of values that represents a particular logical point in time at which an index was synchronized, by one or more processors, with an indexed table indexed by the index;
   receiving a query after the particular logical point in time; and
   using the particular value to compute results of the query based on a state of the index and the indexed table as of the particular logical point in time represented by the particular value;
   wherein the method is performed by one or more computing devices.

2. The method of claim 1, wherein maintaining the particular value that represents the particular logical point in time comprises storing a system change number (SCN) in association with the index.

3. The method of claim 1, wherein maintaining the particular value that represents the particular logical point in time comprises storing a timestamp.

4. The method of claim 1, wherein a transaction that modifies the indexed table is committed after the particular logical point in time and before the query is received, and wherein using the particular value to compute results for the query comprises providing data that reflects the state of the indexed table as of the particular logical point in time represented by the particular value.

5. The method of claim 4, wherein the query is a first query that does not specify the particular value that represents the particular logical point in time, and wherein using the particular value to compute results for the first query comprises executing a second query that is based on the first query and specifies the particular value that represents the particular logical point in time.

6. A method comprising:
   determining a plurality of values, wherein each value of the plurality of values represents a logical point in time at which a database reflects changes made by committed transactions;
   maintaining, on a volatile or non-volatile computer-readable storage medium, a particular value of the plurality of values that represents a particular logical point in time at which an index was synchronized, by one or more processors, with an indexed table indexed by the index;
   after the particular logical point in time, receiving a query to be run against the indexed table; and
   re-writing the query based on the particular logical point in time represented by the particular value;
   wherein the method is performed by one or more computing devices.

7. The method of claim 6, wherein rewriting the query includes rewriting the query to reference one or more base structures comprising the index.

8. The method of claim 6, wherein a transaction that modifies the indexed table is committed after the particular logical point in time and before the query is received, and wherein re-writing the query comprises adding to the query a clause that specifies that data is to be provided that reflects the state of the indexed table as of the particular logical point in time represented by the particular value.

9. The method of claim 8, further comprising invalidating the stored query in response to the index and the indexed table being synchronized.

10. The method of claim 6, further comprising storing the query as re-written.

11. The method of claim 6, wherein the query does not specify the particular value that represents the particular logical point in time, and wherein the rewritten query specifies the particular value that represents the particular logical point in time, further comprising:
   computing results for the query by executing the rewritten query.

12. A non-transitory computer-readable storage medium that stores one or more sequences of instructions which, when executed by one or more processors, causes the one or more processors to perform:
   determining a plurality of values, wherein each value of the plurality of values represents a logical point in time at which a database reflects changes made by committed transactions;
   maintaining a particular value of the plurality of values that represents a particular logical point in time at which an index was synchronized, by one or more processors, with an indexed table indexed by the index;
   receiving a query after the particular logical point in time; and
   using the particular value to compute results of the query based on a state of the index and the indexed table as of the particular logical point in time represented by the particular value.

13. The computer-readable storage medium of claim 12, wherein the one or more processors perform maintaining the particular value that represents the particular logical point in time by storing a system change number (SCN) in association with the index.

14. The computer-readable storage medium of claim 12, wherein the one or more processors perform maintaining the particular value that represents the particular logical point in time by storing a timestamp.

15. The computer-readable storage medium of claim 12, wherein a transaction the modifies the indexed table is committed after the particular logical point in time and before the query is received, and wherein the one or more processors perform using the particular value to compute results for the query by providing data that reflects the state of the indexed table as of the particular logical point in time represented by the particular value.

16. The computer-readable storage medium of claim 12, wherein the query is a first query that does not specify the particular value that represents the particular logical point in time, and wherein the one or more processors perform using the particular value to compute results for the first query by executing a second query that is based on the first query and specifies the particular value that represents the logical point in time.

17. A non-transitory computer-readable storage medium that stores one or more sequences of instructions which, when executed by one or more processors, causes the one of more processors to perform:
   determining a plurality of values, wherein each value of the plurality of values represents a logical point in time at which a database reflects changes made by committed transactions;
   maintaining a particular value of the plurality of values that represents a particular logical point in time at which an index was synchronized, by one or more processors, with an indexed table indexed by the index;
   after the particular logical point in time, receiving a query to be run against the indexed table; and
   re-writing the query based on the particular logical point in time represented by the particular value.

18. The non-transitory computer-readable storage medium of claim 17, wherein the one or more processors perform rewriting the query by rewriting the query to reference one or more base structures comprising the index.

19. The non-transitory computer-readable storage medium of claim 17, wherein a transaction that modifies the indexed table is committed after the particular logical point in time and before the query is received, and wherein the one or more processors perform re-writing the query by adding to the query a clause that specifies that data is to be provided that reflects the state of the indexed table as of the particular logical point in time represented by the particular value.

20. The non-transitory computer-readable storage medium of claim 19, wherein the one or more sequences of instruction further cause the one or more processors to perform:
   invalidating the stored query in response to the index and the indexed table being synchronized.

21. The non-transitory computer-readable storage medium of claim 17, wherein the one or more sequences of instruction further cause the one or more processors to perform:
   storing the query as re-written.

22. The non-transitory computer-readable storage medium of claim 17, wherein the query does not specify the particular value that represents the particular logical point in time, and wherein the rewritten query specifies the particular value that represents the particular logical point in time, wherein the one or more sequences of instruction further cause the one or more processors to perform:
   computing results for the query by executing the rewritten query.

* * * * *

UNITED STATES PATENT AND TRADEMARK OFFICE
CERTIFICATE OF CORRECTION

| | | |
|---|---|---|
| PATENT NO. | : 7,814,117 B2 | Page 1 of 1 |
| APPLICATION NO. | : 11/784341 | |
| DATED | : October 12, 2010 | |
| INVENTOR(S) | : Thomas Baby et al. | |

It is certified that error appears in the above-identified patent and that said Letters Patent is hereby corrected as shown below:

In column 7, line 4, delete "be,used" and insert -- be used --, therefor.

In column 10, line 6, in claim 15, delete "the modifies" and insert -- that modifies --, therefor.

Signed and Sealed this
Thirty-first Day of May, 2011

David J. Kappos
*Director of the United States Patent and Trademark Office*